(No Model.)
J. S. DODGE.
VEGETABLE WASHER.
No. 322,429. Patented July 21, 1885.
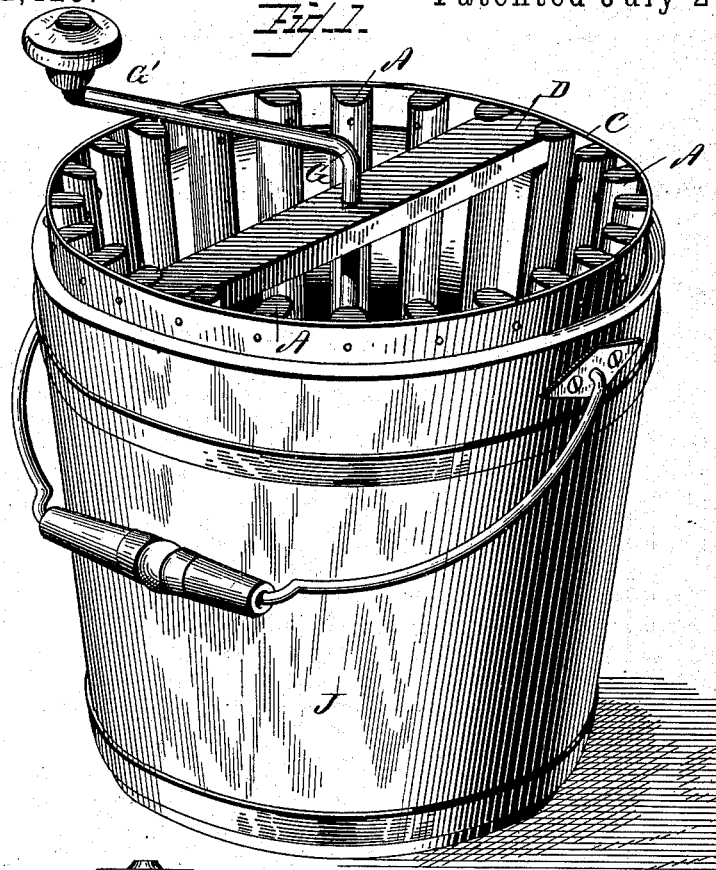
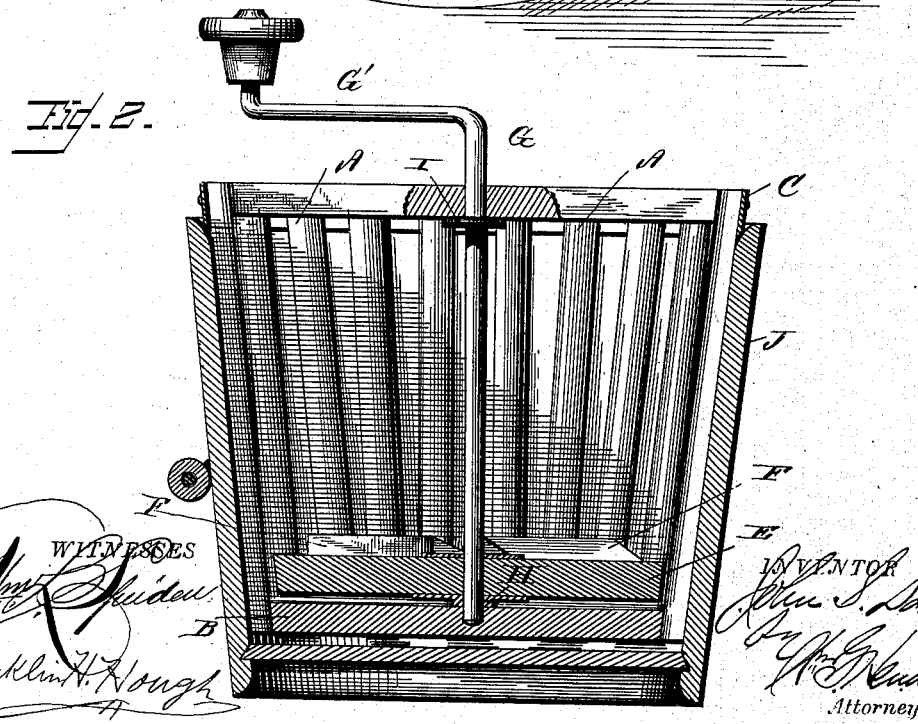

United States Patent Office.

JOHN S. DODGE, OF MAYERSVILLE, MISSISSIPPI.

VEGETABLE-WASHER.

SPECIFICATION forming part of Letters Patent No. 322,429, dated July 21, 1885.

Application filed October 15, 1883. (No model.)

*To all whom it may concern:*

Be it known that I, JOHN S. DODGE, a citizen of the United States, residing at Mayersville, in the county of Issaquena and State of Mississippi, have invented certain new and useful Improvements in Vegetable-Washers; and I do hereby declare the following to be a full, clear, and exact description of the invention, such as will enable others skilled in the art to which it appertains to make and use the same, reference being had to the accompanying drawings.

Figure 1 is a perspective view of the tub inclosing the slatted cage, and Fig. 2 is a vertical section through Fig. 1.

My invention relates to a device for washing potatoes and other vegetables, and has for its object to improve such devices as have heretofore been made by combining with a slatted cage adapted to be placed in and removed from a bucket or inclosing-vessel, a revolving plate or disk located within the cage near its bottom and provided on its top face with a series of beveled strips radiating from the center toward the periphery of the plate or disk, so that when the inclosing-vessel is filled with water and the vegetables placed therein and the plate or disk revolved, the water will be agitated and the vegetables carried round therein by the revolving plate or disk without being struck by it to bruise and injure them, the beveled strips on the face of the plate or disk lifting the vegetables without injury, so that they will be caused to circulate about in the water and dashed against the slats of the stationary cage, the water that is between the slats and which is deflected backward when it strikes the slats cushioning the vegetables so that they are not injured by striking against the slats.

If the revolving disk were used without the strips, the water would not be sufficiently agitated nor the vegetables impelled with force enough to insure their thorough cleansing; and if the strips were used without the revolving plate or disk to carry the vegetables along, so as to break the force of the blow from the strips against them, the vegetables would be bruised and injured; and if the cage were revolved along with the plate or disk instead of being immovable, the water and vegetables would not be as thoroughly nor as quickly cleansed as when the cage is held stationary. The cage might, however, by mechanism easily supplied by a mechanic, be revolved in an opposite direction to the movement of the plate or disk with its strips and still be within the scope and spirit of my invention.

Having set forth the nature, object, and advantages of my invention, I will now describe the details of construction of a device illustrating it.

In the accompanying drawings the cage is represented as composed of a series of slats, A, preferably flat on their exterior and convex on their interior faces, arranged in the form of a circle and secured by nails or other means at their lower ends to the periphery of a bottom plate or board, B, and secured at their upper ends to a binding hoop or band, C, by nails, screws, or other means.

A transverse bar, D, is run across the top of the cage and fitted at both ends between two of the slats, with its top face preferably flush with the top edge of the cage and secured in place to the hoop or band by screws or other means. When placed and secured as described, it strengthens and braces against lateral strain the upper portion of the cage.

The plate or disk E has secured by screws or other means to its top face a series of strips, F, which radiate from the center toward the periphery of the disk and have their upper faces beveled from side to side. The plate or disk is nearly the same diameter as the bottom of the cage and is held and revolved within the cage by a shaft, G, which has a crank-handle, G', at its upper end. This shaft passes through the plate or disk and is rigidly secured or clamped thereto in any suitable manner by screwing it through the plate, or by clamping-nuts bearing against opposite faces of the plate, or otherwise, and its lower end is stepped in the bottom of the cage, so that when turned it will revolve the plate or disk. The plate or disk is held slightly above the bottom of the cage, so as to reduce the frictional contact, and the means that I prefer to employ therefor is a collar, H, which is on the shaft next to the plate and rests on the bottom of the cage and aids in steadying the plate and relieves to some extent the strain on the shaft and cross-bar; but it is obvious that it may be omitted, and that the only point of contact may be between the rounded end of the shaft and the bottom of the cage.

To prevent the plate and shaft from lifting up when operated, a collar, I, may be keyed or otherwise secured to the shaft immediately under the cross-bar so as to bear against the same.

The cage and revolving disk constructed as described are fitted into a tub or inclosing-vessel, J, which also is preferably of circular form and of a size for the cage to fit snugly and firmly therein, the flat exterior faces of the slats permitting them to fit closely to the sides of the vessel.

I prefer to construct the cage and inclosing-vessel so that they will fit snugly to each other, but the cage can be set into any suitable vessel without it being made specially therefor; and it is obvious that many changes in the details of construction of the several parts can be made without departing from my invention.

I am aware that vegetable-washers have been made of a vessel formed with closed sides and having a rotatable shaft carrying either a disk, or else beveled arms at its lower end, and also that a cage has been employed having a shaft carrying arms at its lower end; but my invention is different therefrom, and has for its object to overcome the objections to such constructions hereinbefore specified.

Having fully described my invention and set forth its merits, what I claim is—

In a vegetable-washer, the combination, with a grated cage and a vertical rotatable shaft within the same, of both a disk secured to the lower end of the shaft and ribs or strips secured to the top of the said disk to rotate therewith, whereby both the disk and strips move and agitate the article to be cleansed, while the disk prevents the article from passing under the strips and being injured by the latter, substantially as described.

In testimony whereof I affix my signature in presence of two witnesses.

JOHN S. DODGE.

Witnesses:
F. F. WHITE,
J. M. MARSHALL.